US012116887B2

(12) United States Patent
Hamzah et al.

(10) Patent No.: US 12,116,887 B2
(45) Date of Patent: Oct. 15, 2024

(54) METHODS AND APPARATUS TO IDENTIFY AND IMPLEMENT DOWNLINK COMMAND SEQUENCE(S)

(71) Applicant: Nabors Drilling Technologies USA, Inc., Houston, TX (US)

(72) Inventors: Mohammad Hamzah, Katy, TX (US); Tatiana Borges, Katy, TX (US); Carlos Rolong, Spring, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 346 days.

(21) Appl. No.: 17/393,577

(22) Filed: Aug. 4, 2021

(65) Prior Publication Data

US 2023/0038752 A1 Feb. 9, 2023

(51) Int. Cl.
*E21B 47/12* (2012.01)
*E21B 7/04* (2006.01)
*E21B 44/00* (2006.01)
*E21B 47/26* (2012.01)
*G06F 3/04842* (2022.01)

(52) U.S. Cl.
CPC ............... *E21B 47/12* (2013.01); *E21B 7/04* (2013.01); *E21B 44/00* (2013.01); *E21B 47/26* (2020.05); *G06F 3/04842* (2013.01)

(58) Field of Classification Search
CPC ........ G06F 3/04842; E21B 44/00; E21B 7/04; E21B 47/26; E21B 47/12
See application file for complete search history.

(56) References Cited

U.S. PATENT DOCUMENTS

| 7,443,312 | B2 * | 10/2008 | Quintero | E21B 47/12 340/855.8 |
| 7,957,946 | B2 * | 6/2011 | Pirovolou | E21B 7/04 702/9 |
| 8,322,461 | B2 * | 12/2012 | Hay | E21B 47/024 175/45 |
| 9,388,635 | B2 * | 7/2016 | Schroter | E21B 47/024 |
| 9,970,284 | B2 * | 5/2018 | Tang | E21B 7/04 |
| 11,286,719 | B2 * | 3/2022 | Benson | E21B 7/04 |
| 11,346,215 | B2 * | 5/2022 | Vempati | G01V 11/002 |
| 2005/0056465 | A1 * | 3/2005 | Virally | E21B 21/08 175/66 |
| 2010/0185395 | A1 * | 7/2010 | Pirovolou | E21B 44/00 702/9 |

(Continued)

*Primary Examiner* — Jeremy L Stanley
(74) *Attorney, Agent, or Firm* — Haynes and Boone, LLP (57) ABSTRACT A method of identifying an instruction combination executable by a surface control system of a drilling rig to change settings of a rotary steerable system ("RSS") tool. The method includes identifying, by an electronic application, a first current RSS setting of the RSS tool; identifying, by the electronic application, a first target RSS setting of the RSS tool; identifying, by the electronic application, a plurality of instruction combinations configured to change the first current RSS setting to the first target RSS setting. Each instruction combination of the plurality of instruction combinations comprises a number of steps, and each step includes a downlink command sequence. The method also includes selecting, by the electronic application, an instruction combination that comprises the least number of steps.

10 Claims, 5 Drawing Sheets

(56) References Cited

U.S. PATENT DOCUMENTS

| | | | | |
|---|---|---|---|---|
| 2011/0024191 | A1* | 2/2011 | Boone | E21B 7/04 |
| | | | | 175/45 |
| 2011/0286309 | A1* | 11/2011 | Sugiura | E21B 47/18 |
| | | | | 367/83 |
| 2011/0297395 | A1* | 12/2011 | Codesal | E21B 44/00 |
| | | | | 175/24 |
| 2012/0024606 | A1* | 2/2012 | Pirovolou | E21B 44/005 |
| | | | | 703/10 |
| 2013/0311147 | A1* | 11/2013 | Greenwood | G06F 30/00 |
| | | | | 703/1 |
| 2014/0049401 | A1* | 2/2014 | Tang | E21B 44/00 |
| | | | | 340/853.6 |
| 2015/0107903 | A1* | 4/2015 | Sugiura | E21B 3/00 |
| | | | | 175/45 |
| 2015/0129306 | A1* | 5/2015 | Coffman | E21B 44/00 |
| | | | | 175/48 |
| 2016/0024847 | A1* | 1/2016 | Benson | E21B 7/06 |
| | | | | 175/24 |
| 2016/0298442 | A1* | 10/2016 | Orban | E21B 47/13 |
| 2017/0191314 | A1* | 7/2017 | Faircloth | E21B 37/00 |
| 2017/0218750 | A1* | 8/2017 | Pan | E21B 47/0228 |
| 2017/0306702 | A1* | 10/2017 | Summers | E21B 7/10 |
| 2017/0321485 | A1* | 11/2017 | Bhosle | G06K 19/0723 |
| 2017/0370152 | A1* | 12/2017 | Samuel | E21B 47/007 |
| 2019/0226333 | A1* | 7/2019 | Vempati | E21B 41/00 |
| 2019/0284924 | A1* | 9/2019 | Zhao | E21B 44/00 |
| 2019/0292898 | A1* | 9/2019 | Quattrone | G05B 13/0265 |
| 2019/0353023 | A1* | 11/2019 | Whitacre | E21B 44/005 |
| 2020/0080409 | A1* | 3/2020 | Haggerty | E21B 7/04 |
| 2020/0095849 | A1* | 3/2020 | Demirer | G06Q 30/0283 |
| 2020/0150156 | A1* | 5/2020 | Ono | G01R 19/2513 |
| 2020/0284135 | A1* | 9/2020 | Benson | E21B 47/024 |
| 2021/0189872 | A1* | 6/2021 | Miller | E21B 47/13 |
| 2021/0198997 | A1* | 7/2021 | Moore | E21B 44/005 |
| 2021/0254448 | A1* | 8/2021 | Phillips | E21B 44/02 |
| 2021/0363829 | A1* | 11/2021 | Ghimire | E21B 7/06 |
| 2021/0381314 | A1* | 12/2021 | Peters | E21B 7/067 |
| 2022/0018221 | A1* | 1/2022 | Zhang | E21B 43/00 |
| 2022/0137568 | A1* | 5/2022 | Singh | G05B 13/048 |
| | | | | 175/24 |
| 2022/0154570 | A1* | 5/2022 | Mehta | E21B 49/003 |
| 2022/0170359 | A1* | 6/2022 | Boualleg | G06N 20/20 |
| 2022/0251938 | A1* | 8/2022 | Whitmore | E21B 47/0228 |
| 2022/0290550 | A1* | 9/2022 | Ba | E21B 44/00 |
| 2022/0358604 | A1* | 11/2022 | Shen | E21B 41/00 |
| 2022/0372861 | A1* | 11/2022 | Wu | E21B 4/02 |
| 2023/0034975 | A1* | 2/2023 | Prill | E21B 47/013 |
| 2023/0046043 | A1* | 2/2023 | Hansen | E21B 7/04 |

* cited by examiner

305 Identify a current setting of the downhole tool

310 Identify a target setting of the downhole tool

315 Identify a plurality of instruction combinations that change the current setting to the target setting, with each instruction combination includes a number of steps and each step includes a downlink command sequence

320 Identify the instruction combination that comprises the least number of steps

| Command # | Steering Mode |
|---|---|
| 0-0 | Set Toolface = 0, Steering Ratio = 0% |
| 0-1 | Set Toolface = 0, Steering Ratio = 15% |
| 0-2 | Set Toolface = 0, Steering Ratio = 30% |
| 0-3 | Set Toolface = 0, Steering Ratio = 45% |
| 0-4 | Set Toolface = 0, Steering Ratio = 60% |
| ... | |
| 2-0 | Increase Steering Ratio by 10% |
| 2-1 | Decrease Steering Ratio by 10% |
| 2-2 | Increase Toolface by 12 Degrees |
| 2-3 | Decrease Toolface by 12 Degrees |
| 2-4 | Inclination Hold with Left Turn |
| 2-5 | Inclination Hold with No Turn |
| 2-6 | Inclination Hold with Right Turn |
| ... | |

METHODS AND APPARATUS TO IDENTIFY AND IMPLEMENT DOWNLINK COMMAND SEQUENCE(S)

FIELD OF THE DISCLOSURE

The disclosure herein relates to methods and apparatuses for identifying and implementing a downlink command sequence that changes the settings of a downhole tool.

BACKGROUND

During a drilling operation, a driller sends instructions to a bottom hole assembly ("BHA") so that tool settings associated with the BHA are changed, which results in pointing the drilling bit in a certain direction. Often, the instructions are sent to the BHA—or downlinked—via a downlink sequence that requires the adjustment of control parameters over a set period of time.

Conventionally, when the driller wants to change the settings of a tool associated with the BHA, the driller controls the adjustment of the control parameters and the selection of downlink command sequences throughout the set period of time. This may include sending, via a drilling module of a surface control system, control signals to a drive control system and/or a mud pump control system. Therefore, the driller has to manually select either a single downlink command sequence or a combination thereof to change the downhole tool settings. Further, when the downlink sequence requires a control parameter to alternate between two values every few seconds, the driller may rely on a traditional stopwatch to determine when to alternate between the two values. In some instances, the driller relies on an automated program that alerts the driller when to alternate between the two values. If the driller misreads the stopwatch or misses an alert from the automated program, the control parameter may not be altered at the correct time and the instructions may fail to downlink to the downhole tool. Additionally, if there are multiple ways to adjust the drilling system to reach a target setting, a driller must manually spend time deciding which downlink command sequence is the best sequence to stay within the planned drilling trajectory.

SUMMARY OF THE DISCLOSURE

In some embodiments, the present disclosure includes a method of identifying an instruction combination executable by a surface control system of a drilling rig to change settings of a rotary steerable system ("RSS") tool, the method including identifying, by an electronic application, a first current RSS setting of the RSS tool; identifying, by the electronic application, a first target RSS setting of the RSS tool; identifying, by the electronic application, a plurality of instruction combinations configured to change the first current RSS setting to the first target RSS setting; wherein each instruction combination of the plurality of instruction combinations includes a number of steps, and wherein each step includes a downlink command sequence; and selecting, by the electronic application, an instruction combination that includes the least number of steps. In some embodiments, the first current RSS setting is one or more of: a current toolface setting, a current steering proportion setting, a current inclination setting, and a current azimuth setting; and wherein the first target RSS setting is one or more of: a target toolface setting; a target steering proportion setting, a target inclination setting, and a target azimuth setting. In some embodiments, identifying, by the electronic application, the first target RSS setting of the RSS tool includes: comparing the first current RSS setting to a first measured RSS setting to determine a difference; identifying an expected response from the RSS tool; and identifying the first target RSS setting based on the difference and the expected response from the RSS tool. In some embodiments, the method also includes identifying, by the electronic application, a second current RSS setting of the RSS tool; and identifying, by the electronic application, a second target RSS setting of the RSS tool; wherein the first current RSS setting is different from the second current RSS setting; wherein the first target RSS setting is different from the second target RSS setting; and wherein each of the plurality of identified instruction combinations is further configured to change the second current RSS setting to the second target RSS setting. In some embodiments, the method also includes displaying the selected instruction combination on a graphical user interface for approval by a user. In some embodiments, the method also includes the electronic application instructing the surface control system of the drilling rig to implement the downlink command sequence(s) of the selected instruction combination. In some embodiments, the method also includes automatically executing the downlink command sequence(s) of the selected instruction combination. In some embodiments, the surface control system executing the downlink command sequence(s) of the selected instruction combination includes altering one or more of: a mud flow rate, a rotation per minute ("RPM") of a top drive, and a mud pump pressure. In some embodiments, each of the current toolface setting, the current steering proportion setting, the current inclination setting, and the current azimuth setting is associated with the RSS tool being in a first configuration; wherein each of the target toolface setting, the target steering proportion setting, the target inclination setting, and the target azimuth setting is associated with the RSS tool being in a second configuration that is different from the first configuration; and wherein the change from the first configuration to the second configuration is the change the first current RSS setting to the first target RSS setting. In some embodiments, identifying, by the electronic application, the first current RSS setting of the RSS tool includes identifying the most previously implemented downlink command sequence.

In some embodiments, the present disclosure includes apparatus that includes an electronic application that identifies an instruction combination executable by a surface control system of a drilling rig to change settings of a rotary steerable system ("RSS") tool, wherein the electronic application is configured to: identify a first current RSS setting of the RSS tool; identify a first target RSS setting of the RSS tool; identify a plurality of instruction combinations configured to change the first current RSS setting to the first target RSS setting; wherein each instruction combination of the plurality of instruction combinations includes a number of steps, and wherein each step includes a downlink command sequence; and select an instruction combination that includes the least number of steps. In some embodiments, the first current RSS setting is one or more of: a current toolface setting, a current steering proportion setting, a current inclination setting, and a current azimuth setting; and wherein the first target RSS setting is one or more of: a target toolface setting; a target steering proportion setting, a target inclination setting, and a target azimuth setting. In some embodiments, identifying the first target RSS setting of the RSS tool includes: comparing the first current RSS setting to a first measured RSS setting to determine a difference;

identifying an expected response from the RSS tool; and identifying the first target RSS setting based on the difference and the expected response from the RSS tool. In some embodiments, the electronic application is further configured to: identify a second current RSS setting of the RSS tool; and identify a second target RSS setting of the RSS tool; wherein the first current RSS setting is different from the second current RSS setting; wherein the first target RSS setting is different from the second target RSS setting; and wherein each of the plurality of identified instruction combinations is further configured to change the second current RSS setting to the second target RSS setting. In some embodiments, the electronic application is further configured to display the selected instruction combination on a graphical user interface for approval by a user. In some embodiments, the electronic application is further configured to instruct the surface control system of the drilling rig to implement the downlink command sequence(s) of the selected instruction combination. In some embodiments, the electronic application is further configured to: execute the downlink command sequence(s) of the selected instruction combination. In some embodiments, the surface control system executing the downlink command sequence(s) of the selected instruction combination includes altering one or more of: a mud flow rate, a rotation per minute ("RPM") of a top drive, and a mud pump pressure. In some embodiments, each of the current toolface setting, the current steering proportion setting, the current inclination setting, and the current azimuth setting is associated with the RSS tool being in a first configuration; wherein each of the target toolface setting, the target steering proportion setting, the target inclination setting, and the target azimuth setting is associated with the RSS tool being in a second configuration that is different from the first configuration; and wherein the change from the first configuration to the second configuration is the change the first current RSS setting to the first target RSS setting. In some embodiments, identifying the first current RSS setting of the RSS tool includes identifying the most previously implemented downlink command sequence.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

The apparatus and methods disclosed herein optimize the drilling process by identifying a plurality of instruction combinations that, if implemented, alter a current rotary steerable system ("RSS") setting to a target RSS setting. Additionally, the method and apparatus also identify one instruction combination of the plurality of instruction combinations as ideal or best when it uses the fewest number of steps to change a current setting to a target setting. In some embodiments, the best instruction combination is selected to be implemented. In some embodiments, the selected instruction combination is implemented by the surface control system to change the RSS setting(s). Generally, a RSS includes some type of steering device, such as extendable and retractable arms that apply lateral forces along a borehole wall to gradually effect a turn. As such, the selection and implementation of an instruction combination can change the state of steering device from a first state in which the arms are in a first configuration to a second state in which the arms are in a second configuration that is different from the first configuration.

Figure 1:
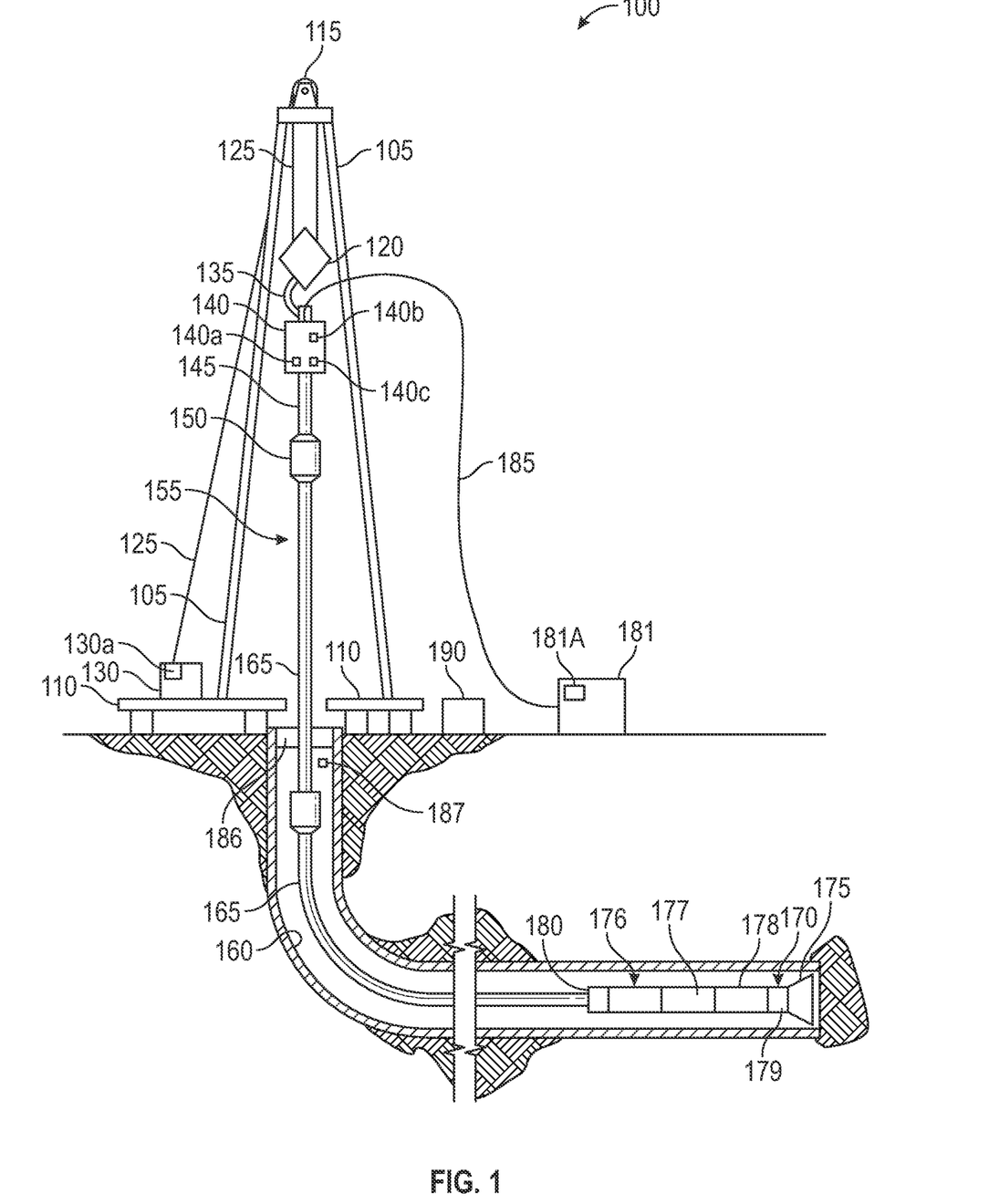
FIG. 1 is a schematic diagram of a drilling rig apparatus according to one or more aspects of the present disclosure.

Referring to FIG. 1, illustrated is a schematic view of an apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to draw works 130, which is configured to reel out and reel in the drilling line 125 to cause the traveling block 120 to be lowered and raised relative to the rig floor 110. The draw works 130 may include a rate of penetration ("ROP") sensor 130a, which is configured for detecting an ROP value or range, and a surface control system to feed-out and/or feed-in of a drilling line 125. The other end of the drilling line 125, known as a dead line anchor, is anchored to a fixed position, possibly near the draw works 130 or elsewhere on the rig.

A hook 135 is attached to the bottom of the traveling block 120. A drive system 140 is suspended from the hook 135. A quill 145, extending from the drive system 140, is attached to a saver sub 150, which is attached to a drill string 155 suspended within a wellbore 160. Alternatively, the quill 145 may be attached to the drill string 155 directly. The term "quill" as used herein is not limited to a component which directly extends from the drive system 140, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill." In the example embodiment depicted in FIG. 1, the drive system 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 may additionally or alternatively include a torque sensor 140a coupled to or otherwise associated with the drive system 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The drive system 140 may additionally or alternatively include or otherwise be associated with a speed sensor 140b configured to detect a value or range of the rotational speed of the quill 145. The drive system 140, the draw works 130, the crown block 115, the traveling block 120, drilling line or dead line anchor may additionally or alternatively include or otherwise be associated with a weight-on-bit ("WOB") or hook load sensor 140c (e.g., one or more sensors installed somewhere in the load path mechanisms to detect and calculate WOB, which can vary from rig-to-rig). The WOB sensor 140c may be configured to detect a WOB value or range, where such detection may be performed at the drive system 140, the draw works 130, or other component of the apparatus 100. Generally, the hook load sensor 140c detects the load on the hook 135 as it suspends the drive system 140 and the drill string 155.

The drill string 155 includes interconnected sections of drill pipe or tubulars 165 and a BHA 170, which includes a drill bit 175. The BHA 170 may include one or more measurement-while-drilling ("MWD") or wireline conveyed instruments 176, flexible connections 177, an RSS 178 that includes adjustment mechanisms 179 for push-the-bit drilling or bent housing and bent subs for point-the-bit drilling, a downhole control system 180, stabilizers, and/or drill collars, among other components. One or more pumps of a mud pump system 181 may deliver drilling fluid to the drill string 155 through a hose or other conduit 185, which may be connected to the drive system 140. In some embodiments, a mud pump sensor 181a monitors the output of the mud pump system 181 and may measure the flow rate produced by the mud pump system 181 and/or a pressure produced by the mud pump system 181.

The downhole MWD or wireline conveyed instruments 176 may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, sent to the downhole control system 180, and downloaded from the instrument(s) at the surface and/or transmitted real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, and/or transmission as electromagnetic pulses. The MWD tools and/or other portions of the BHA 170 may have the ability to store measurements for later retrieval via wireline and/or when the BHA 170 is tripped out of the wellbore 160.

In some embodiments, the downhole control system 180 is configured to control or assist in the control of one or more components of the apparatus 100. For example, the downhole control system 180 may be configured to transmit operational control signals to the surface control system 190, the draw works 130, the drive system 140, other components of the BHA 170 such as the adjustment mechanism 179, and/or the mud pump system 181. The downhole control system 180 may be a stand-alone component that forms a portion of the BHA 170 or be integrated in the adjustment mechanism 179 or a sensor that forms a portion of the BHA 170. The downhole control system 180 may be configured to transmit the operational control signals or instructions to the draw works 130, the drive system 140, other components of the BHA 170, and/or the mud pump system 181 via wired or wireless transmission means which, for the sake of clarity, are not depicted in FIG. 1.

In an example embodiment, the apparatus 100 may also include a rotating blow-out preventer ("BOP") 186, such as if the wellbore 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 186. The apparatus 100 may also include a surface casing annular pressure sensor 187 configured to detect the pressure in the annulus defined between, for example, the wellbore 160 (or casing therein) and the drill string 155. It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

Figure 2:
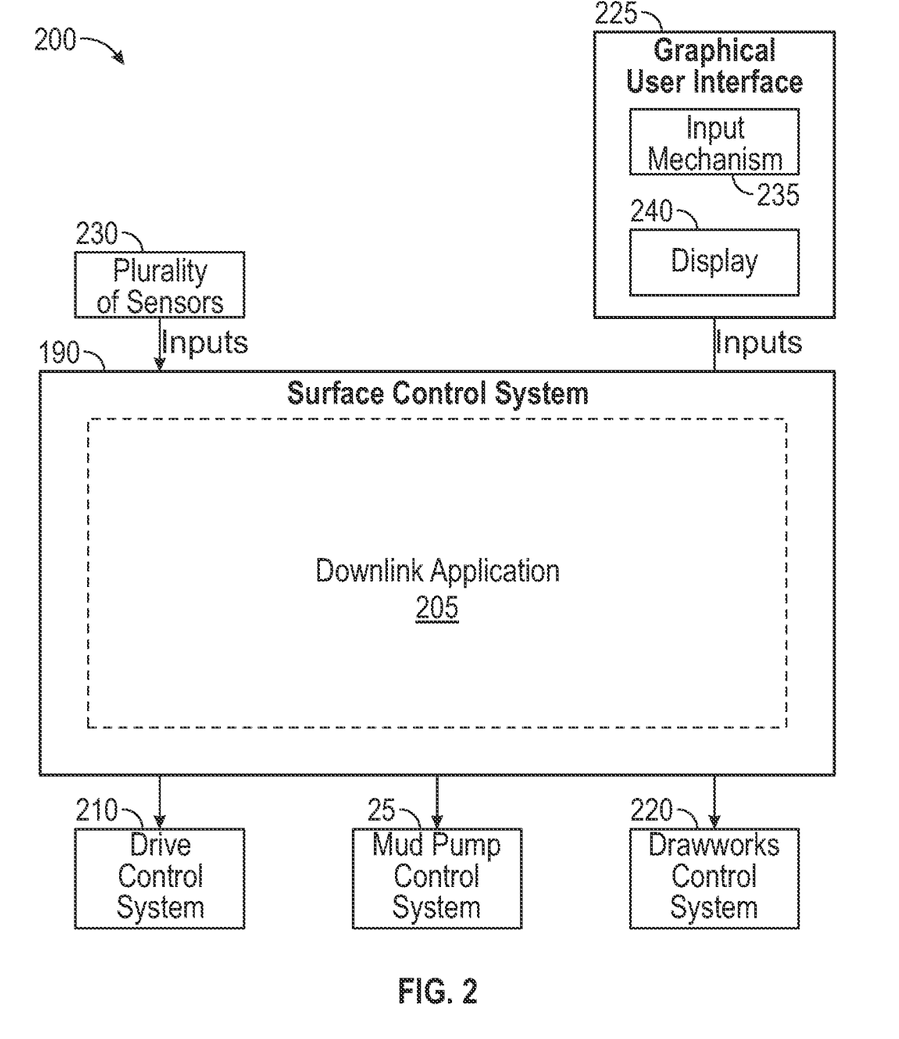
FIG. 2 is a diagrammatic illustration of a data flow involving at least a portion of the drilling rig apparatus of FIG. 1, according to one or more aspects of the present disclosure.

FIG. 2 is a diagrammatic illustration of a data flow 200 involving at least a portion of the apparatus 100 according to one embodiment. Generally, the surface control system 190 is operably coupled to or includes a downlink application 205 that identifies and selects a downlink command sequence for downlinking process. The application 205 sends a selected instruction combination, which includes a downlink command sequence to the surface control system 190. The surface control system 190 instructs one or more of a drive control system 210, a mud pump control system 215, and a draw works control system 220 to implement the selected downlink command sequence to fluctuate top drive rotation, pump pressure, and flow rate.

In some embodiments, the surface control system 190 is, or forms a portion of, a computing system that is configured to control or assist in the control of one or more components of the apparatus 100. For example, the surface control system 190 may be configured to transmit operational control signals to the draw works 130, the drive system 140, the BHA 170 and/or the mud pump system 181. The surface control system 190 may be a stand-alone component installed near the mast 105 and/or other components of the apparatus 100. In an example embodiment, the surface control system 190 includes one or more systems located in a control room proximate the mast 105, such as the general-purpose shelter often referred to as the "doghouse" serving as a combination tool shed, office, communications center, and general meeting place. The surface control system 190 may be configured to transmit the operational control signals to the draw works 130, the drive system 140, the BHA 170, and/or the mud pump system 181 via wired or wireless transmission means.

In some embodiments, the downlink application 205 is an electronic application operably coupled to the drive control system 210, the mud pump control system 215, and the draw works control system 220, and is configured to send signals to each of the control systems 210, 215, and 220 to control the operation of the drive system 140, the mud pump system 181, and the draw works 130. The downlink application 205 may include a variety of sub modules, with each of the sub modules being associated with a predetermined workflow or recipe that executes a task from beginning to end. Often, the predetermined workflow includes a set of computer-implemented instructions for executing the task from beginning to end, with the task being one that includes a repeatable sequence of steps that take place to implement the task. As described below, the downlink application 205 may identify which instruction combination or downlink command sequence(s) the surface control system 190 should implement. In some embodiments, the downlink application 205 receives current RSS settings. The current RSS settings may be the last settings input by the surface control system 190 or the last settings selected by an operator using a graphical user interface ("GUI") 225. In some embodiments, and as illustrated, the application 205 and the surface control system 190 may be integral components of a single system or surface control system 190. However, in other embodiments, the application 205 is stored in a component that is physically spaced from the surface control system 190. In this instance, the application 205 may be coupled to or accessed by the surface control system 190 via a wireless network or wired connection. In some embodiments, the application 205 may produce a specific downlink command sequence to implement and send the results to the GUI 225, where a user can review and approve the results produced by the application 205. In some embodiments, the user approves the results and sends then the results to the surface control system 190 to implement.

In some embodiments the drive control system 210 includes the torque sensor 140a, the quill position sensor, the hook load sensor 140c, the pump pressure sensor, the MSE sensor, and the rotary RPM sensor, and a surface control system and/or other means for controlling the rotational position, speed and direction of the quill or other drill string component coupled to the drive system (such as the quill 145 shown in FIG. 1). The drive control system 210 is configured to receive a drive control signal from the application 205, if not also from other components of the apparatus 100. The drive control signal directs the position (e.g., azimuth), spin direction, spin rate, and/or oscillation of the quill 145. The drive control system 210 is not required to include a top drive, but instead may include other drive systems, such as a power swivel, a rotary table, a coiled tubing unit, a downhole motor, and/or a conventional rotary rig, among others.

In some embodiments, the mud pump control system 215 includes a mud pump surface control system and/or other means for controlling the flow rate and/or pressure of the output of the mud pump system 181 and any associated sensors, such as the mud pump sensor 181a, for monitoring the output of the mud pump system 181.

In some embodiments, the draw works control system 220 includes the draw works surface control system and/or other means for controlling the feed-out and/or feed-in of the drilling line 125. Such control may include rotational control of the draw works (in v. out) to control the height or position of the hook 135 and may also include control of the rate the hook 135 ascends or descends.

As illustrated, the GUI 225 is operably coupled to or the surface control system 190. The GUI 225 includes an input mechanism 235 for user-inputs. The input mechanism 235 may include a touch-screen, keypad, voice-recognition apparatus, dial, button, switch, slide selector, toggle, joystick, mouse, data base and/or other conventional or future-developed data input device. Such input mechanism 235 may support data input from local and/or remote locations. Alternatively, or additionally, the input mechanism 235 may include means for user-selection of input parameters, user-selection of target settings, selecting to implement the selected instruction combination, and/or selecting a type of tool that forms a portion of the BHA 170, such as via one or more drop-down menus, input windows, etc. In general, the input mechanism 235 and/or other components within the scope of the present disclosure support operation and/or monitoring from stations on the rig site as well as one or more remote locations with a communications link to the system, network, local area network ("LAN"), wide area network ("WAN"), Internet, satellite-link, and/or radio, among other means. The GUI 225 may also include a display 240 for visually presenting information to the user in textual, graphic, or video form. The display 240 may also be utilized by the user to input the input parameters in conjunction with the input mechanism 235. For example, the input mechanism 235 may be integral to or otherwise communicably coupled with the display 240. Depending on the implementation, the display 240 may include, for example, an LED or LCD display computer monitor, touchscreen display, television display, a projector, or other display device. The GUI 225 and the surface control system 190 may be discrete components that are interconnected via wired or wireless means. Alternatively, the GUI 225 and the surface control system 190 may be integral components of a single system or surface control system 190.

A plurality of sensors 230 provide inputs or data to the surface control system 190 via wired or wireless transmission means. The plurality of sensors 230 may include the ROP sensor 130a; the torque sensor 140a; the quill speed sensor 140b; the hook load sensor 140c; the mud pump sensor 181a; the surface casing annular pressure sensor 187; a downhole annular pressure sensor; a shock/vibration sensor that is configured for detecting shock and/or vibration in the BHA 170; a toolface sensor configured to estimate or detect the current toolface orientation or toolface angle; a MWD WOB sensor configured to detect WOB at or near the BHA 170; a bit torque sensor that generates data indicative of the torque applied to the bit 175; the hook position sensor; a rotary RPM sensor; a quill position sensor; a pump pressure sensor; a MSE sensor; a bit depth sensor; and any variation thereof. The downhole annular pressure sensor may be configured to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. These measurements may include both static annular pressure (pumps off) and active annular pressure (pumps on). However, in other embodiments the downhole annular pressure may be calculated using measurements from a plurality of other sensors located downhole or at the surface of the well. The toolface sensor may be or include a conventional or future-developed gravity toolface sensor which detects toolface orientation relative to the Earth's gravitational field. Alternatively, or additionally, the toolface sensor may be or include a conventional or future-developed magnetic toolface sensor which detects toolface orientation relative to magnetic north or true north. In an example embodiment, a magnetic toolface sensor may detect the current toolface when the end of the wellbore is less than about 7° from vertical, and a gravity toolface sensor may detect the current toolface when the end of the wellbore is greater than about 7° from vertical. However, other toolface sensors may also be utilized within the scope of the present disclosure, including non-magnetic toolface sensors and non-gravitational inclination sensors. The toolface sensor may also, or alternatively, be or include a conventional or future-developed gyro sensor.

The plurality of sensors 230 may additionally or alternatively include an inclination sensor integral to the BHA 170 that is configured to detect inclination at or near the BHA 170. The plurality of sensors 230 may additionally or alternatively include an azimuth sensor integral to the BHA 170 that is configured to detect azimuth at or near the BHA 170. In some embodiments, the BHA 170 also includes another directional sensor (e.g., azimuth, inclination, toolface, combination thereof, etc.) that is spaced along the BHA 170 from a first directional sensor (e.g., the inclination sensor, the azimuth sensor). For example, and in some embodiments, the sensor is positioned in the MWD or wireline conveyed instruments 176 and the first directional sensor is positioned in the adjustment mechanism 179, with a known distance between them, for example 20 feet, configured to estimate or detect the current toolface orientation or toolface angle. The sensors may be spaced along the BHA 170 in a variety of configurations. The data detected by any of the sensors in the plurality of sensors 230 may be sent via electronic signal to the surface control system 190 via wired or wireless transmission.

The detection performed by the sensors described herein may be performed once, continuously, periodically, and/or at random intervals. The detection may be manually triggered by an operator or other person accessing a human-machine interface ("HMI") or GUI, or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

Generally, the surface control system 190: monitors, in real-time, tool settings and drilling operations relating to a wellbore; creates and/or modifies drilling instructions based on the monitored drilling operations; monitors the responsiveness of drilling equipment used in the drilling operation; and identifies potential problems with downlinking operations based on the responsiveness. As used herein, the term "real-time" is thus meant to encompass close to real-time, such as within about 10 seconds, preferably within about 5 seconds, and more preferably within about 2 seconds. "Real-time" can also encompass an amount of time that provides data based on a wellbore drilled to a given depth to provide actionable data according to the present disclosure before a further wellbore being drilled achieves that depth.

Figure 3:
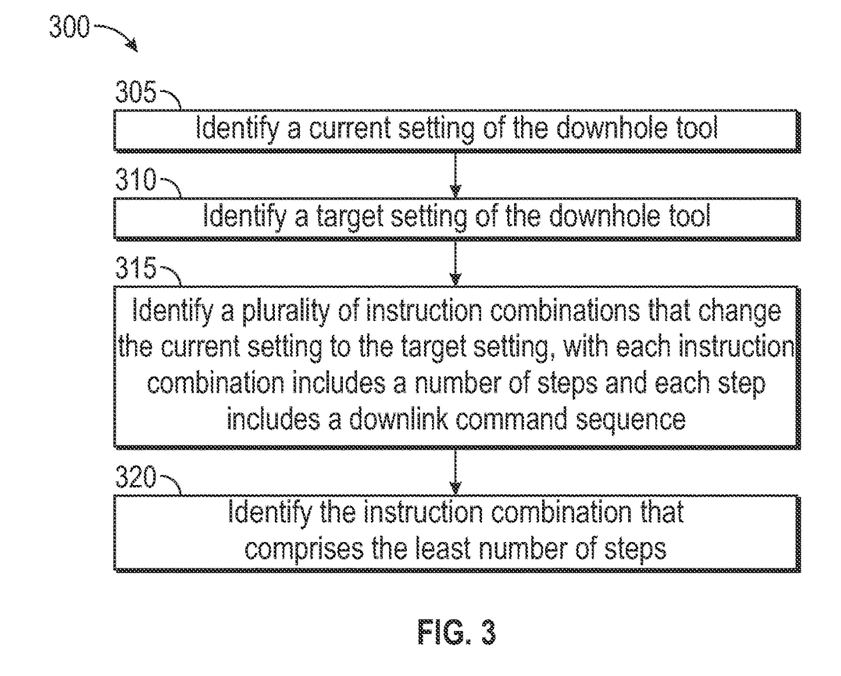
FIG. 3 is a flow chart diagram of a method according to one or more aspects of the present disclosure.

FIG. 3 is a flow chart showing an example method 300 of identifying an instruction combination executable by a surface control system of a drilling rig to change settings of a downhole tool. It is understood that additional steps can be provided before, during, and after the steps of method 300, and that some of the steps described can be replaced or eliminated for other implementations of the method 300. In an example embodiment, the method 300 of identifying an instruction combination executable by a surface control system 190 of a drilling rig to change the settings of downhole tool includes the application 205 identifying a current setting of the downhole tool at step 305; identifying a target setting of the downhole tool at step 310; identifying a plurality of instruction combinations that change the current setting to the target setting, with each instruction combination including a number of steps and each step including a downlink command sequence at step 315; and identifying the instruction combination that includes the least number of steps at step 320.

In some embodiments and at the step 305, the application 205 identifies the current setting of the downhole tool. In some embodiments, the downhole tool is or forms a portion of the RSS 178 and the current setting is a current RSS setting. A current RSS setting may include a current toolface setting and/or a current steering proportion but is not limited to these settings. In some embodiments, the current setting identified is any one or more of the following: a current setting of toolface, a current setting of steering ratio, a current setting of inclination, a current setting of azimuth, and a current setting of dogleg severity. In some embodiments and at step 305, more than one current setting is identified during the step 305. In some embodiments, the current setting is a current state of the tool. In some embodiments, the current setting is identified after receiving signals or indications from the BHA 180 reporting the current setting of the tool. These signals or indications may be received via conventional data transmission methods that include, for example, digitally encoding data and transmitting the encoded data to the surface, possibly as pressure pulses in the drilling fluid or mud system, acoustic transmission through the drill string 155, electronic transmission through a wireline or wired pipe, and/or transmission as electromagnetic pulses. In other embodiments, the current setting is identifying and input by the operator via the display 240. In yet other embodiments, the current setting is based on the most recently implemented downlink sequence implemented by the surface control system 190. In some embodiments, the current setting includes both a current toolface setting and a current steering proportion.

In some embodiments and at step 310, the application 205 identifies a target setting of the downhole tool. The target setting may be or include a target setting of toolface, a target setting of steering ratio, a target setting of inclination, a target setting of azimuth, and/or a target setting of dogleg severity. In some embodiments, more than one target setting is identified during the step 310. In some embodiments, the target setting is a specific target value. In some embodiments, the target setting is a range, such that a tolerance level can be included. In some embodiments, the tolerance level is: +/−5 for target toolface, +/−5 for target inclination, +/−5 for target azimuth, and +/−10 for steering ratio. In some embodiments, a larger range for the target setting is provided for the target steering ratio. In some embodiments, a user provides the target setting via the display 240. In some embodiments, the surface control system 190 identifies the target setting. In other embodiments, the target setting is generated by the application 205 after the application 205 compares the location or trajectory of the RSS 178 to a planned well path.

Figure 4:
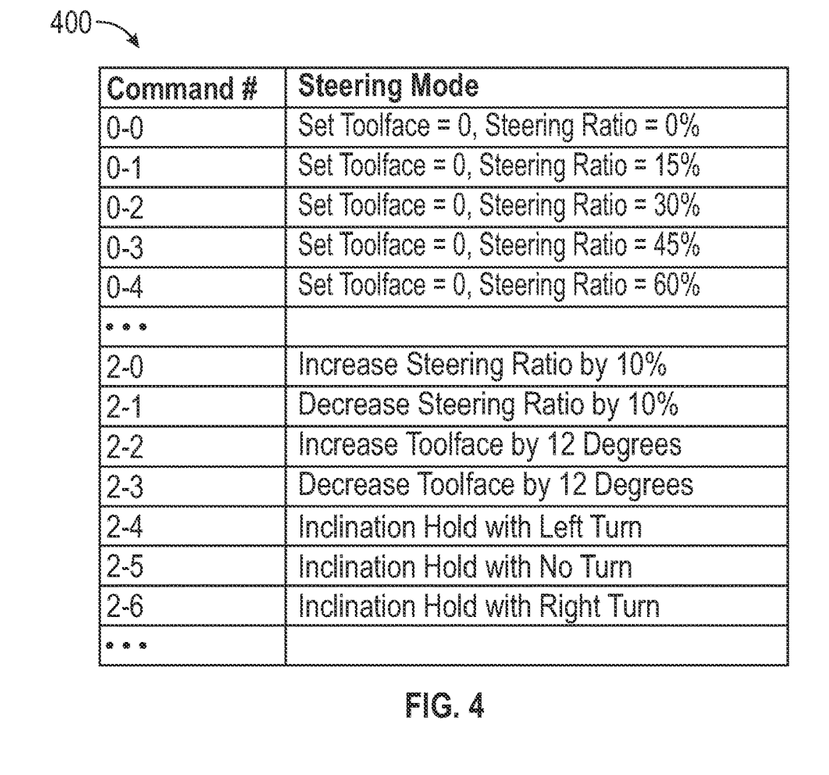
FIG. 4 is a table listing example downlink commands according to one or more aspects of the present disclosure.

In some embodiments and at step 315, the application 205 identifies a plurality of instruction combinations that are capable of changing the current setting to the target setting. Each instruction combination includes a number of steps and each step is a downlink command sequence. The number of steps may be one, with one downlink command sequence needed to change the current setting to the target setting. However, the number of steps may be greater than one with multiple downlink command sequences needed to change the current setting to the target setting. FIG. 4 illustrates an example chart 400 depicting a number of downlink commands sequences. Generally, specifics of each downlink command sequences are provided by the downhole tool manufacturer and may require the adjustment of control parameters over a set period of time. In some embodiments, a plurality of preprogrammed downlink sequences is stored in or accessible by the application 205, with the plurality of preprogrammed downlink sequences being the tool manufactures' recommended output values associated with the mud pump system 181 and/or the drive system 140. For example, one downlink command sequence may require a control parameter to alternate between two values every few seconds for a certain period of time. The example chart 400 depicts an abbreviated downlink command sequence list. Each downlink command sequence may be identified by a particular command number and each downlink command sequence informs the RSS 178 of a change in settings. In some embodiments and during the step 315, the application 205 identifies any instruction combination that would result in the current setting being changed to the target setting.

In some embodiments, all of the possible instruction combinations are analyzed to project if a particular instruction combination, if implemented, would achieve the target setting. In some embodiments, a list of potential instruction combinations is created, and the list contains each potential instruction combination projected by the application 205 to match the target setting if implemented. In some embodiments, the potential instruction combination matches target toolface with a toolface command in the downlink command sequence list. In some embodiments, the potential instruction combination matches target steering ratio with a steering ratio command in the downlink command sequence list. In some embodiments, the potential instruction combination matches the target steering ratio and toolface setting to a steering ratio and toolface command in the downlink command sequence list. In some embodiments, the potential instruction combination adjusts target toolface with steering ratio adjustment commands in the downlink command sequence list. In some embodiments, the potential instruction combination adjusts target toolface with toolface adjustment commands in the downlink command sequence list. In some embodiments, the potential instruction combination adjusts target inclination with build inclination and drop inclination commands in the downlink command sequence list. In some embodiments, the potential instruction combination adjusts target azimuth with turn azimuth to the left or turn azimuth to the right commands in the downlink command sequence list. In some embodiments, the potential instruction combination adjusts tool mode changes with target outcome of target toolface and target steering ratio, target inclination and target azimuth, and target dogleg severity, and target tortuosity.

Figure 5:
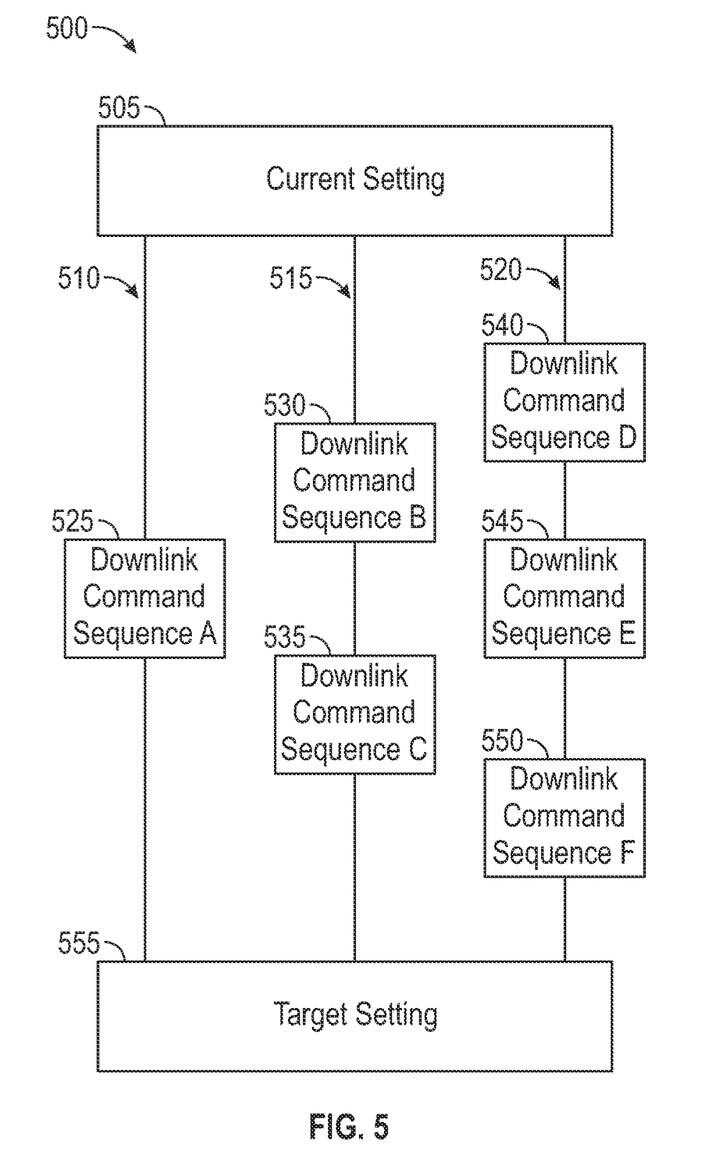
FIG. 5 is diagram illustrating different combinations of downlink commands to take a current setting to a target setting according to one or more aspects of the present disclosure.

In some embodiments, the application 205 performs the step 315. In some embodiments, the application 205 calculates any one or more of the following: the trajectory of dogleg severity, tortuosity, and steering lag response to determine how the current setting differs from the target setting. In some embodiments, the application 205 compares the current setting to a first measured setting to determine a difference; identifies an expected response from the RSS 178; and identifies the target setting based on the difference and the expected response from the RSS 178. In some embodiments at step 315, the application 205 takes into account the last downlink command sequence received and a running total of required downlink command sequences needed to reach the target setting when identifying the plurality of instruction combinations configured to change the current setting to the target setting. In some embodiments at step 315, the application 205 analyzes expected tool response from steering ratio and/or steering ratio drilled distance when identifying the plurality of instruction combinations configured to change the current setting to the target setting. In some embodiments at step 315, the application 205 projects an outcome for each instruction combination and determines if an instruction combination, if implemented, would achieve the target setting. In some embodiments, during the step 315, the application 205 determines if the pumps must be recycled for each instruction combination. In some embodiments, during the step 315, the application 205 includes instruction combinations that are within a specified range of the target setting, rather than identical to the target setting. In some embodiments, during the step 315, the application 205 identifies the most previously implemented downlink command sequence. FIG. 5 illustrates an example diagram 500 illustrating all identified instruction combinations that would change the current setting 505 to the target setting 508. As illustrated, instruction combinations 510, 515, and 520 are combinations that, if implemented, would change the current setting 505 to the target setting 508. Instruction combination 510 includes one downlink command sequence, namely downlink command sequence A 525; instruction combination 515 includes two downlink command sequences, namely Command Sequence B 530 and Command Sequence C 535; and instruction combination 520 includes three downlink command sequences, namely Command Sequence D 540, Command Sequence E 545, and Command Sequence F 550. Each of downlink command sequences 525, 530, 535, 540, 545, and 550 may be one of the commands listed in the chart 400. In some embodiments, the instruction combinations 510, 515, and 520 are potential instruction combinations.

In some embodiments and at step 320, the instruction combination that comprises the least number of steps and therefore the least number of downlink command sequences is identified. Referring to FIG. 5, in this example diagram 500, the instruction combination 510 is identified during the step 320 because the instruction combination 510 has the fewest number of steps and the fewest number of downlink command sequences out of the potential instruction combinations.

In some embodiments, the application 205 identifies a plurality of current settings and a plurality of target settings during the step 305 and the application 205 identifies the instruction combination that results in the plurality of current settings changing to the plurality of target settings.

In some embodiments, the method 300 further includes displaying the selected instruction combination on the GUI 225. In some embodiments, an operator reviews the selected instruction combination and selects it to be implemented using the GUI 225. The selected instruction combination is then sent to the surface control system 190 to be executed.

In some embodiments, a toolface setting of the RSS 178, an inclination setting of the RSS 178, and an azimuth setting of the RSS 178 is associated with the RSS 178 being in a specific physical configuration or state. That is, a toolface setting is not required to be expressed in a specific toolface value (expressed in degrees) but may be a configuration of the RSS tool that is expected to result in a specific toolface value. Similarly, with the inclination and azimuth settings, these settings may be associated with the RSS 178 being in a specific physical configuration or setting that is expected to result in specific inclination and azimuth values. As such, changes in these settings may involve a change in the physical configuration, state, or setting of the RSS 178.

In some embodiments, the selected instruction combination is sent automatically to the surface control system 190. In some embodiments, the selected instruction combination is automatically executed, with or without user approval, using the surface control system 190. That is, the downlink command sequence(s) of the selected instruction combination are executed by the surface control system 190. In some embodiments, the application 205 instructs the surface control system 190 to implement the downlink command sequence(s) of the selected instruction combination to change the current settings to the target settings. In some embodiments, the downlink sequence of the selected instruction combination, when initiated, requires alteration of any one or more of the following: mud flow rate, RPM of the top drive 140, and mud pump pressure. In some embodiments, the downlink command sequence of the selected instruction combination requires the mud pump system 181 to alter parameters to vary the mud pump pressure according to the downlink command sequence. In some embodiments, the downlink command sequence of the selected instruction combination alters functioning of the top drive 140. In some embodiments, the downlink command sequence of the selected instruction combination alters the functioning of the draw works 130.

The application 205 and/or completion of at least a portion of the method 300 provides multiple benefits over conventional systems. In some embodiments, the application 205 and/or completion of at least a portion of the method 300 does not require the user to manually select the sequence of a series of downlink command(s) to the RSS 178. In some embodiments, the application 205 and/or completion of at least a portion of the method 300 optimizes the amount of time it takes to perform downlinks commands by changing the flow rate or rpm on surface. In some embodiments, the application 205 and/or completion of at least a portion of the method 300 improves the consistency of the number and sequence of downlink commands performed by the rotary steerable system operator. In some embodiments, the application 205 and/or completion of at least a portion of the method 300 does not require the rotary steerable system operator to spend time deciding on the appropriate downlink command or commands for the RSS 178 to stay within the planned trajectory.

Figure 6:
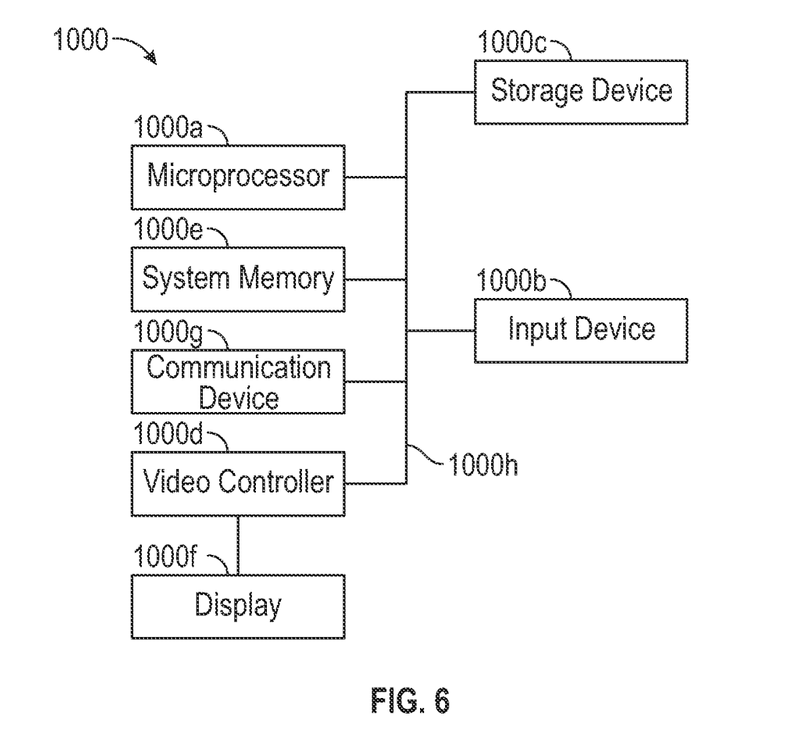
FIG. 6 is a diagrammatic illustration of a node for implementing one or more example embodiments of the present disclosure, according to an example embodiment.

In an example embodiment, as illustrated in FIG. 6 with continuing reference to FIGS. 1-5, an illustrative node 1000 for implementing one or more of the example embodiments described above and/or illustrated in FIGS. 1-5 is depicted. The illustrative node 1000 includes a microprocessor 1000a, an input device 1000b, a storage device 1000c, a video surface control system 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-5 include at least the illustrative node 1000 and/or components thereof, and/or one or more nodes that are substantially similar to the illustrative node 1000 and/or components thereof. In several example embodiments, one or more of the above-described components of the illustrative node 1000, the apparatus 100, and/or the example embodiments described above and/or illustrated in FIGS. 1-5 include respective pluralities of same components.

In several example embodiments, one or more of the applications, systems, and application programs described above and/or illustrated in FIGS. 1-6 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations and this is within the contemplated scope of disclosure herein, unless stated otherwise.

The phrase "at least one of A and B" should be understood to mean "A, B, or both A and B." The phrases "one or more of the following: A, B, and C" and "one or more of A, B, and C" should each be understood to mean "A, B, or C; A and B, B and C, or A and C; or all three of A, B, and C."

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of identifying an instruction combination executable by a surface control system of a drilling rig and changing settings of a rotary steerable system ("RSS") tool, the method comprising:
   identifying, by an electronic application, a last executed downlink command sequence sent to the RSS tool;
      wherein the electronic application is operably coupled to the surface control system;
      wherein the surface control system is configured to transmit operational control signals to a drive system of the drilling rig and to a mud pump system of the drilling rig;
   identifying, by the electronic application, a first current RSS setting of the RSS tool based on the last executed downlink command sequence;
      wherein the first current RSS setting is associated with the RSS tool being in a first configuration; and
      wherein the first current RSS setting is one or more of: a current toolface setting, a current steering proportion setting, a current inclination setting, and a current azimuth setting;
   identifying, by the electronic application, a first target RSS setting of the RSS tool;
      wherein the first target RSS setting is associated with the RSS tool being in a second configuration that is different from the first configuration; and
      wherein the first target RSS setting is one or more of: a target toolface setting; a target steering proportion setting, a target inclination setting, and a target azimuth setting;
   identifying, by the electronic application, a plurality of instruction combinations configured to change the first current RSS setting to the first target RSS setting;
      wherein the change of the first current RSS setting to the first target RSS setting is a change to the RSS tool from the first configuration to the second configuration;
      wherein each instruction combination of the plurality of instruction combinations comprises a number of steps, and
      wherein each step includes a downlink command sequence;
   comparing, by the electronic application, the number of steps in each of the plurality of instruction combinations to identify a least number of steps;
   selecting, by the electronic application, an instruction combination that comprises the least number of steps;
      wherein the selected instruction combination comprises a downlink command sequence that requires adjustment of a control parameter over a set period of time; and
      wherein the control parameter is one of a mud flow rate; a rotation per minute of a top drive; and a mud pump pressure; and
   automatically executing, by the surface control system, the downlink command sequence(s) of the selected instruction combination;
      wherein automatically executing, by the surface control system, the downlink command sequence(s) of the selected instruction combination comprises automatically adjusting one or more of: the mud flow rate using the mud pump system, the rotation per minute ("RPM") of a top drive using the drive system, and the mud pump pressure using the mud pump system over the set period of time.

2. The method of claim 1, wherein identifying, by the electronic application, the first target RSS setting of the RSS tool comprises:
   comparing the first current RSS setting to a first measured RSS setting to determine a difference;
   identifying an expected response from the RSS tool; and
   identifying the first target RSS setting based on the difference and the expected response from the RSS tool.

3. The method of claim 1, further comprising:
   identifying, by the electronic application, a second current RSS setting of the RSS tool; and
   identifying, by the electronic application, a second target RSS setting of the RSS tool;
      wherein the first current RSS setting is different from the second current RSS setting;
      wherein the first target RSS setting is different from the second target RSS setting; and
      wherein each of the plurality of identified instruction combinations is further configured to change the second current RSS setting to the second target RSS setting.

4. The method of claim 1, further comprising displaying the selected instruction combination on a graphical user interface for approval by a user.

5. The method of claim 1, further comprising the electronic application instructing the surface control system of the drilling rig to implement the downlink command sequence(s) of the selected instruction combination.

6. An apparatus configured to identify an instruction combination executable by one or more processors of a surface control system of a drilling rig and to change settings of a rotary steerable system ("RSS") tool comprising:
   the surface control system configured to transmit operational control signals to a drive system of the drilling rig and to a mud pump system of the drilling rig; and
   a non-transitory computer readable medium having stored thereon a plurality of instructions, wherein the instructions are executed with one or more processors so that the following steps are executed:
      identify a last executed downlink command sequence sent to the RSS tool;
      identify a first current RSS setting of the RSS tool based on the last executed downlink command sequence;
         wherein the first current RSS setting is associated with the RSS tool being in a first configuration; and wherein the first current RSS setting is one or more of: a current toolface setting, a current steering proportion setting, a current inclination setting, and a current azimuth setting identify a first target RSS setting of the RSS tool;
  wherein the first target RSS setting is associated with the RSS tool being in a second configuration that is different from the first configuration; and
  wherein the first target RSS setting is one or more of: a target toolface setting; a target steering proportion setting, a target inclination setting, and a target azimuth setting;

identify a plurality of instruction combinations configured to change the first current RSS setting to the first target RSS setting;
  wherein the change of the first current RSS setting to the first target RSS setting is a change to the RSS tool from the first configuration to the second configuration;
  wherein each instruction combination of the plurality of instruction combinations comprises a number of steps,
  wherein each step includes a downlink command sequence; and compare the number of steps in each of the plurality of instruction combinations to identify a least number of steps;

select an instruction combination that comprises the least number of steps;
  wherein the selected instruction combination comprises a downlink command sequence that requires adjustment of a control parameter over a set period of time; and
  wherein the control parameter is one of a mud flow rate; a rotation per minute of a top drive; and a mud pump pressure; and automatically execute, by the surface control system, the downlink command sequence(s) of the selected instruction combination;
  wherein automatically executing, by the surface control system, the downlink command sequence(s) of the selected instruction combination comprises automatically adjusting one or more of: the mud flow rate using the mud pump system, the rotation per minute ("RPM") of a top drive using the drive system, and the mud pump pressure using the mud pump system over the set period of time.

7. The apparatus of claim 6, wherein identifying the first target RSS setting of the RSS tool comprises:
  comparing the first current RSS setting to a first measured RSS setting to determine a difference;
  identifying an expected response from the RSS tool; and
  identifying the first target RSS setting based on the difference and the expected response from the RSS tool.

8. The apparatus of claim 6, wherein the instructions are executed with the one or more processors so that the following steps are also executed:
  identify a second current RSS setting of the RSS tool; and
  identify a second target RSS setting of the RSS tool;
  wherein the first current RSS setting is different from the second current RSS setting;
  wherein the first target RSS setting is different from the second target RSS setting; and
  wherein each of the plurality of identified instruction combinations is further configured to change the second current RSS setting to the second target RSS setting.

9. The apparatus of claim 6, wherein the instructions are executed with the one or more processors so that the following step is also executed: display the selected instruction combination on a graphical user interface for approval by a user.

10. The apparatus of claim 6, wherein the instructions are executed with the one or more processors so that the following step us also executed: instruct the surface control system of the drilling rig to implement the downlink command sequence(s) of the selected instruction combination.

* * * * *